No. 623,545. Patented Apr. 25, 1899.
D. HUFNAGEL.
STOCK WATERER.
(Application filed Nov. 18, 1898.)
(No Model.)
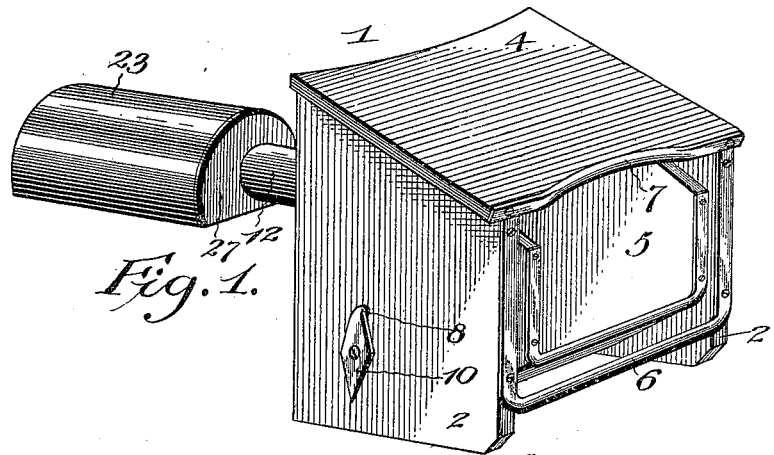
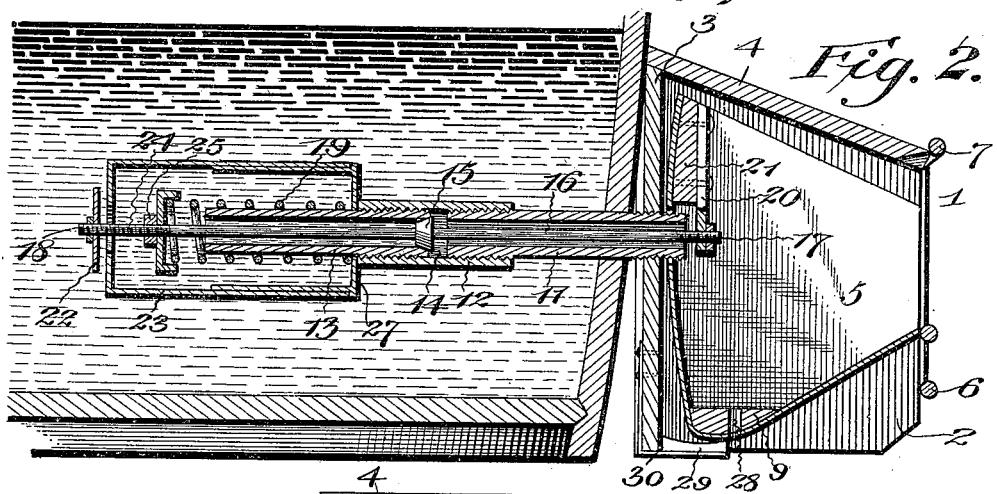
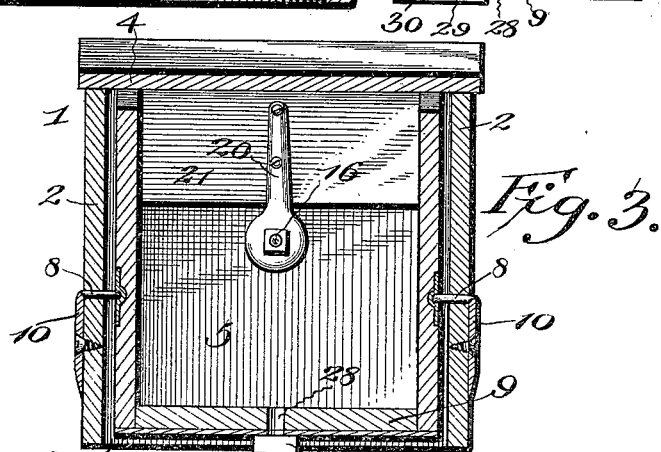
Witnesses
Inventor,
Daniel Hufnagel.

UNITED STATES PATENT OFFICE.

DANIEL HUFNAGEL, OF MILO, ILLINOIS.

STOCK-WATERER.

SPECIFICATION forming part of Letters Patent No. 623,545, dated April 25, 1899.

Application filed November 18, 1898. Serial No. 696,793. (No model.)

*To all whom it may concern:*

Be it known that I, DANIEL HUFNAGEL, a citizen of the United States, residing at Milo, in the county of Bureau and State of Illinois, have invented a new and useful Stock-Waterer, of which the following is a specification.

The invention relates to improvements in stock-waterers.

The object of the present invention is to improve the construction of stock-waterers and to provide a simple, inexpensive, and efficient device designed to dispense with a float-valve and adapted to afford a fresh supply of water from the tank or reservoir each time an animal drinks from it and capable of measuring approximately the water-supply to the animal to prevent waste.

Another object of the invention is to provide a simple and efficient device for draining any water remaining in the drinking-compartment after an animal leaves it, so that ice will not accumulate in the device in winter or hot water in summer.

The invention consists in the construction and novel combination and arrangement of parts, as hereinafter fully described, illustrated in the accompanying drawings, and pointed out in the claims hereto appended.

In the drawings, Figure 1 is a perspective view of a stock-waterer constructed in accordance with this invention. Fig. 2 is a longitudinal sectional view of the same. Fig. 3 is a transverse sectional view.

Like numerals of reference designate corresponding parts in all the figures of the drawings.

1 designates a casing composed of sides 2, a back 3, and a top 4, which is preferably disposed at an inclination, as shown, and the bottom of the casing is open to permit water draining from a drinking receptacle or trough 5 to escape from the device. The front of the frame is supported near the bottom by a transverse bracing-rod 6, which has its ends extended longitudinally of the front edges of the sides 2, forming attachment and bracing plates, and the front edge of the top 4 is supported by a reinforcing-rod 7. The lower face of the top 4 is beveled at its front edge, and the reinforcing-rod is slightly curved, as shown, to avoid presenting any sharp edges to the animals.

The drinking trough or receptacle is composed of similar sides, a back, a bottom, and an inclined front portion extending a short distance above the bottom of the trough or receptacle, the same being open at the top and front to enable the head of a hog or other animal to be readily introduced into it. The sides of the frame or casing are provided with inwardly-projecting journals or pivots 8, and the drinking trough or receptacle is provided at opposite sides with bearings for the reception of the same, and the said journals are located in rear of the center of the trough or receptacle, whereby an animal introducing its head into the same will tilt the trough or receptacle forward for operating the valve mechanism, hereinafter described. The back, bottom, and inclined front portion are preferably constructed of a continuous piece of sheet metal, and the lower ends of the sides of the drinking trough or receptacle are preferably connected by a wooden cross-piece 9. The journals or pivots 8, which extend through openings of the sides of the casing, are preferably formed integral with exterior attachment-plates 10, which are screwed or otherwise secured to the casing.

The casing is connected by a tube 11 with a tank or reservoir, into which the tube or pipe 11 projects, and its inner end is connected by a coupling 12 with an inner pipe-section 13, spaced from the outer pipe or section to provide a valve-chamber 14, in which is arranged a valve 15. The valve 15 is normally seated against the inner section 13 and is tapered to fit the adjacent beveled end of the same, and it is mounted on a longitudinal rod 16, which extends through the inner and outer pipe-sections. The rod extends entirely through the inner and outer pipe-sections, its outer end 17 being connected with the pivotally-mounted drinking trough or receptacle, and its inner end 18 is engaged by one end of a coiled spring 19, which serves to retain the valve on its seat and to hold the front portion of the drinking trough or receptacle elevated. When the front portion of the drinking trough or receptacle is depressed by reason of a hog or other animal attempting to obtain a supply of water, the rod will be reciprocated outwardly, thereby opening the valve and permitting a quantity of water to flow into the trough or receptacle. The outer end of the rod passes through a perforated ear or eye 20, formed by a plate secured to and depending from a cross-piece 21, which is arranged at the upper portion of the back of the drinking trough or receptacle at a point above the supply-pipe, the back being provided with an opening which loosely receives the latter.

The ends of the rod are threaded and provided with nuts, and the nut at the inner end of the rod bears against a valve-disk 22, which coöperates with an opening of a removable section 23 of the casing of the device. The inner threaded portion 24 of the rod receives an inner nut 25, which forms a bearing or stop for the inner end of the coiled spring, a disk or plate being interposed between the same and the nut, as clearly shown in Fig. 2 of the accompanying drawings. The other end of the spring bears against a fixed section 27 of the casing, which is mounted on the inner pipe-section, and it telescopes within the section 23 and forms an abutment for the coupling which connects the inner and outer pipe-sections. The casing constitutes a measuring-compartment for delivering a given quantity of water to an animal, and when the rod is reciprocated to open the valve 15 the valve-disk 22 covers the opening of the section 23 and excludes water from the same.

The bottom of the drinking trough or receptacle is provided with a drain-opening 28, which is uncovered when the trough or receptacle is in its normal elevated position, but which is automatically covered by a valve 29 when the trough or receptacle is depressed. The valve 29, which is constructed of any suitable material, is mounted on a horizontal arm of an L-shaped spring 30, which has its other arm secured to the back of the casing. After an animal has finished drinking and leaves the device the trough or receptacle will be elevated by the coiled spring, and any water remaining in the same drains off through the bottom-opening, so that it will not accumulate and freeze in the receptacle or trough in cold weather or become very warm in hot weather. By this construction a fresh cool drink is afforded to each animal. In moderate weather when the temperature is not too high or too low the drain-opening of the drinking trough or receptacle may be closed by a removable plug, which will prevent any waste of water.

The invention has the following advantages: The device, which is simple and inexpensive in construction, is strong and durable and especially adapted for distributing water to hogs. It obviates the necessity of employing a float-valve, and it will not freeze and become inoperative in winter. The valve mechanism, which is located within a reservoir or tank, may be located a sufficient distance below the surface of the water to prevent freezing, and the measuring-chamber, which has valves located at opposite ends of it, is adapted to deliver a given quantity of water to an animal, so that each animal will receive a proper amount.

Changes in the form, proportion, and minor details of construction may be resorted to without departing from the spirit or sacrificing any of the advantages of this invention.

What is claimed is—

1. A stock-waterer provided with a depressible drinking-receptacle having a drain-opening, and means for automatically closing the drain-opening when the receptacle is depressed and for uncovering such opening when the receptacle returns to its normal position, substantially as and for the purpose described.

2. A device of the class described comprising a depressible receptacle having a drain-opening, a valve operated by the receptacle, controlling the supply of water to the same, and holding the receptacle normally elevated, and means for automatically covering the drain-opening when the receptacle is depressed and for uncovering the same when the receptacle is elevated, substantially as described.

3. A device of the class described comprising a depressible receptacle having a drain-opening, means for controlling the supply of water to the same, and a valve mounted beneath the receptacle and arranged to cover the drain-opening when the said receptacle is depressed, substantially as described.

4. A device of the class described comprising a casing, a receptacle pivotally mounted in the casing and provided with a drain-opening, a resilient support mounted on the casing and located adjacent to the drain-opening, a valve arranged on the support in position to cover the drain-opening when the receptacle is depressed or tilted, and means for controlling the supply of water to the receptacle, substantially as described.

5. A device of the class described comprising a movable trough or receptacle having an eye or ear, a supply-pipe provided with a valve-chamber having seats at its ends, a reciprocating rod extending through the supply-pipe and having one end connected with the eye or ear of the receptacle, a spring connected with the other end of the rod, and a casing covering the spring, substantially as described.

6. A device of the class described comprising a movable trough or receptacle, a supply-pipe, a measuring compartment or casing connected with the supply-pipe, valves located at opposite ends of the casing or compartment, and means for connecting the valves with the receptacle or trough, substantially as and for the purpose described.

7. A device of the class described comprising a movable drinking-trough, a supply-pipe composed of inner and outer sections and a connecting-coupling forming a valve-chamber, a casing mounted on the supply-pipe and having a valve-opening, a reciprocating rod extending through the casing and the supply-pipe and connected with the trough, and alternately-closing valves mounted on the rod and arranged within the valve-chamber and at the valve-opening of the casing, substantially as described.

In testimony that I claim the foregoing as my own I have hereto affixed my signature in the presence of two witnesses.

DANIEL HUFNAGEL.

Witnesses:
C. S. MARVIN,
JAMES STURM.